United States Patent
Huber et al.

(10) Patent No.: US 9,323,618 B2
(45) Date of Patent: *Apr. 26, 2016

(54) METHOD AND APPARATUS FOR COORDINATING FAULT RECOVERY TECHNIQUES AMONG DOMAINS

(71) Applicant: Tellabs Operations, Inc., Naperville, IL (US)

(72) Inventors: Thomas J. Huber, Naperville, IL (US); Jonathan B. Sadler, Naperville, IL (US); Mark L. Jones, Chamblee, GA (US)

(73) Assignee: Coriant Operations, Inc., Naperville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/334,816

(22) Filed: Jul. 18, 2014

(65) Prior Publication Data

US 2014/0337668 A1 Nov. 13, 2014

Related U.S. Application Data

(63) Continuation of application No. 13/288,405, filed on Nov. 3, 2011, now Pat. No. 8,804,485.

(60) Provisional application No. 61/483,443, filed on May 6, 2011.

(51) Int. Cl.
| | |
|---|---|
| *G01R 31/08* | (2006.01) |
| *G06F 11/14* | (2006.01) |
| *H04L 12/24* | (2006.01) |
| *G06F 11/07* | (2006.01) |

(52) U.S. Cl.
CPC ........ *G06F 11/1402* (2013.01); *G06F 11/0709* (2013.01); *H04L 41/0663* (2013.01)

(58) Field of Classification Search
USPC ............................................................ 714/2
See application file for complete search history.

(56) References Cited

U.S. PATENT DOCUMENTS

| | | | |
|---|---|---|---|
| 5,386,551 A | 1/1995 | Chikira et al. | |
| 7,180,866 B1 * | 2/2007 | Chartre et al. | 370/242 |
| 7,315,510 B1 * | 1/2008 | Owens et al. | 370/218 |
| 8,565,244 B2 * | 10/2013 | Bragg et al. | 370/401 |
| 8,804,485 B2 * | 8/2014 | Huber et al. | 370/216 |

(Continued)

*Primary Examiner* — Duc C Ho
(74) *Attorney, Agent, or Firm* — Hamilton, Brook, Smith & Reynolds, P.C.

(57) ABSTRACT

In a telecommunications/data network, it is common to have multiple recovery domains each employing its own technique for recovering a fault that may be different from a technique employed by another domain. Permitting multiple recovery domains to recover a fault without coordination among the domains can result in adverse interactions, such as rapid and repeated changes in the actions taken or "flapping," and repeated hits to traffic. A method and corresponding apparatus for coordinating fault recovery in a network, according to an embodiment of the present invention, notifies a first recovery domain that a second recovery domain is or is not taking action to recover a fault in the network. Coordinating the recovery efforts of the first and second recovery domains reduces fault recovery time and allows concurrent actions to be taken.

20 Claims, 15 Drawing Sheets

(56) References Cited

U.S. PATENT DOCUMENTS

| | | | |
|---|---|---|---|
| 2004/0114595 A1* | 6/2004 | Doukai | 370/389 |
| 2005/0043868 A1 | 2/2005 | Mitcham | |
| 2008/0031619 A1 | 2/2008 | Xu et al. | |
| 2008/0192626 A1* | 8/2008 | Yang | 370/225 |
| 2009/0201937 A1 | 8/2009 | Bragg et al. | |
| 2011/0075662 A1 | 3/2011 | Rathunde et al. | |
| 2011/0213859 A1 | 9/2011 | Greene et al. | |
| 2011/0229123 A1 | 9/2011 | Li et al. | |
| 2011/0305136 A1 | 12/2011 | Pan et al. | |

* cited by examiner

METHOD AND APPARATUS FOR COORDINATING FAULT RECOVERY TECHNIQUES AMONG DOMAINS

RELATED APPLICATIONS

This application continuation of U.S. application Ser. No. 13/288,405, filed Nov. 3, 2011, which claims the benefit of U.S. Provisional Application No. 61/483,443, filed on May 6, 2011. The entire teachings of the above applications are incorporated herein by reference.

BACKGROUND OF THE INVENTION

Current state of the art networks use implicit means for coordinating different fault recovery techniques, primarily using hold-off timers on one or more fault recovery mechanisms to avoid concurrent action in response to the same failure or fault detection.

SUMMARY OF THE INVENTION

Example embodiments of the present invention may be implemented in the form of a method or corresponding apparatus for coordinating recovery in a network. A method and corresponding apparatus, according to one embodiment, includes notifying a first recovery domain that a second recovery domain is or is not taking action to recover a fault in the network.

The first recovery domain may be notified of a recovery in progress in a number of ways according to several other embodiments. In one embodiment, the first recovery domain may be notified of a recovery in progress by inserting a recovery-in-progress signal in a maintenance message.

In several convenient embodiments, notifying the first recovery domain of a recovery in progress involves an in-band signal or out-of-band signal. In one embodiment, the first recovery domain is notified of a recovery in progress by way of an in-band signal that takes a path on which a fault is observed. In other embodiments, the first recovery domain is notified of a recovery in progress by way of an out-of-band signal from a network manager or an out-of-band signal that takes a path different from a path that includes a fault.

In one embodiment, an indication is related to the notifying. This indication is applied to a policy to determine whether the first recovery domain is to take action.

Several embodiments include being responsive to a switching node within the second recovery domain. According to one embodiment, in response to an alarm indication signal (AIS) received by the switching node, a recovery-in-progress signal is applied within the second recovery domain. According to another embodiment, in response to a fault detected at the switching node within the second recovery domain, an alarm indication signal (AIS) and recovery-in-progress signal are applied.

In an example embodiment, the switching node within the second recovery domain may monitor for a recovery-in-progress signal and, optionally, perform an action responsive to the recovery-in-progress signal, such as initiating a switch to a recover or protection path.

In another embodiment, nodes within the network may be provisioned with a definition of a recovery-in-progress signal.

Embodiments for coordinating recovery may be used for networks in which recovery domains are arranged as a hierarchy of recovery domains (i.e., parent and child recovery domains), a series of concatenated recovery domains with no overlap in recovery domains, and a series of concatenated recovery domains with overlap in recovery domains.

The recovery domains may be for various network technologies, such as Optical Transport Network (OTN), Synchronous Optical Network (SONET)/Synchronous Digital Hierarchy (SDH), and Multiprotocol Label Switching-Transport Profile (MPLS-TP). The recovery domains may be for various network topologies, such as linear, ring, and mesh network topologies.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

In a telecommunications/data network, it is common to have multiple protection/restoration domains (also referred to as "recovery domains"). Each protection/restoration domain employs its own protection/restoration technique, which may be different from a technique employed by another protection/restoration domain. The recovery domains may be for a variety of network technologies, such as Optical Transport Network (OTN), Synchronous Optical Network (SONET)/ Synchronous Digital Hierarchy (SDH), and Multiprotocol Label Switching-Transport Profile (MPLS-TP). The recovery domains may be for a variety of network topologies, such as linear, ring, and mesh network topologies. Further, multiple recovery domains may be organized in one of several ways.

Different fault recovery actions that are taken, at or about the same time, by multiple recovery domains can result in adverse interactions, such as rapid and repeated changes in the actions taken, called "flapping," and repeated hits to traffic. To avoid these problems, prior fault recovery techniques rely on hold-off timers to prevent concurrent recovery by multiple recovery domains. Holding or waiting for a period time before acting, however, can disrupt service and does not allow for concurrent recovery by multiple recovery domains when it is advantageous. An inventive fault recovery technique, according to one embodiment, coordinates recovery by notifying a first recovery domain that a second recovery domain is or is not taking action to recover a fault. The inventive technique can recover a fault more quickly than a timer-based technique and allows for concurrent recovery by multiple recovery domains. Before describing embodiments of the inventive fault recovery technique, example networks in which these embodiments may be employed are described immediately below.

Figure 1A:
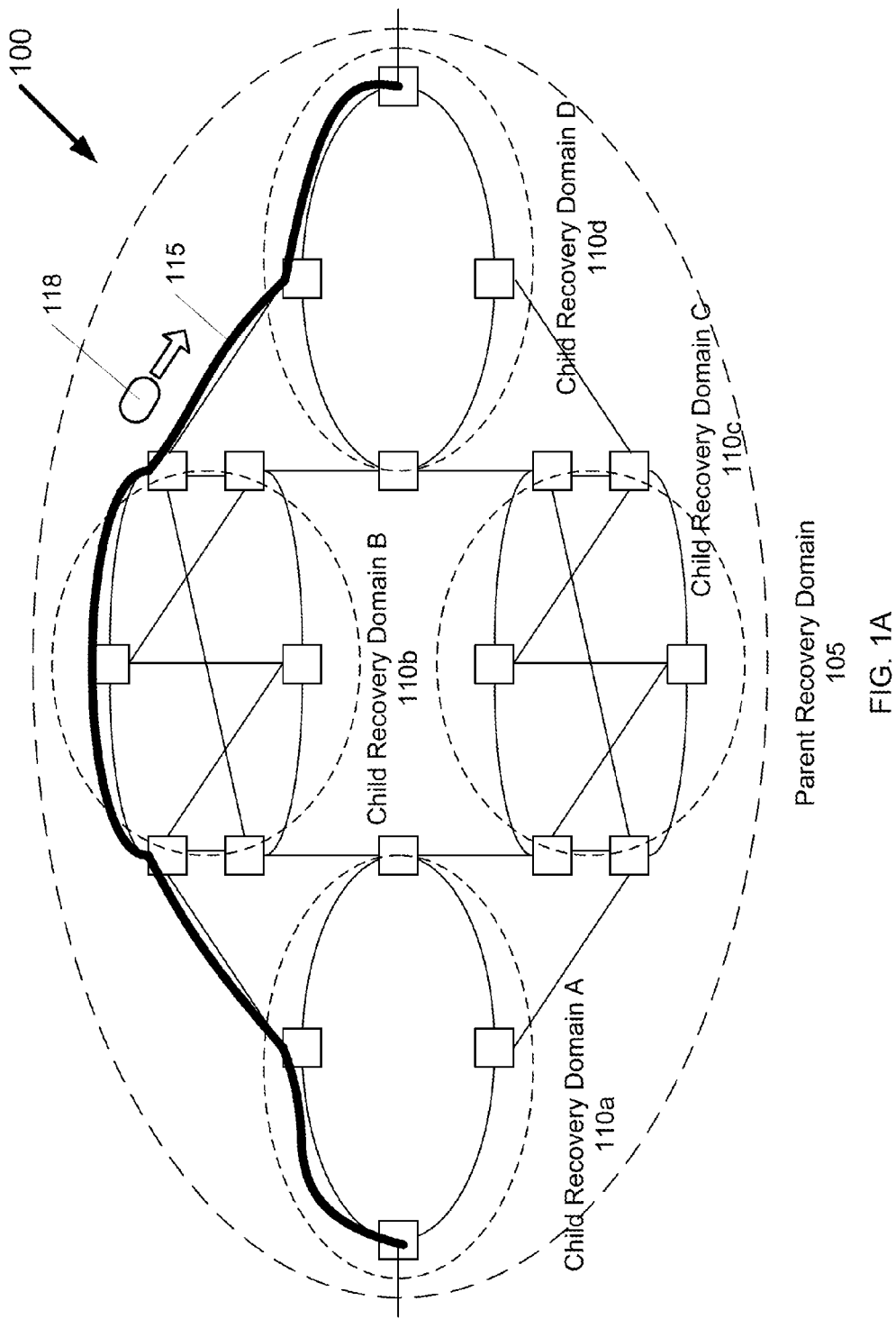
FIGS. 1A-1C are network diagrams of example networks of recovery domains in which embodiments of the present invention may be employed.

FIG. 1A shows a network of recovery domains 100 organized in a hierarchy. In the network 100, there is a parent-child relationship between a parent recovery domain 105 and child recovery domains A-D, 110a-110d. In the network 100, a path 115 traverses the parent recovery domain 105 and child recovery domains A-C, 110a-110c. Described later in greater detail (in reference to FIGS. 3A-C), one or more of these recovery domains (i.e., the parent recovery domain 105 and child recovery domains A-C, 110a-110c) may recover a fault (not shown) in the path 115, and recovery signaling 118 may be employed to coordinate efforts within one or between multiple recovery domain(s).

Figure 1B:
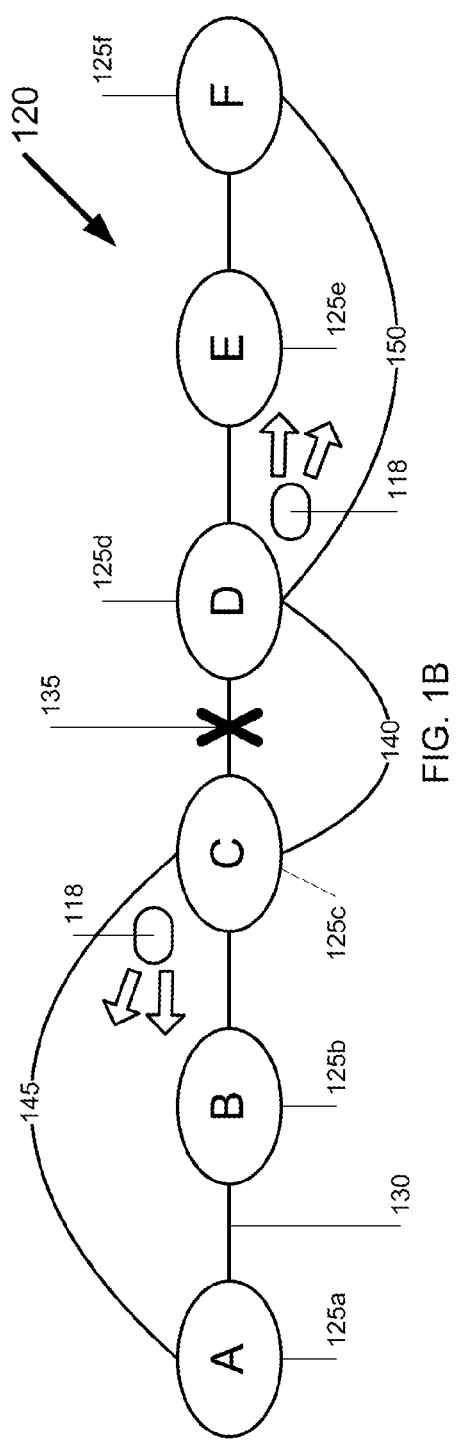

FIG. 1B shows a network of recovery domains 120 organized in a series. In the network 120, recovery domains A-F, 125a-125f, are concatenated together with no overlap in recovery domains. The term "concatenated" herein is defined to be linked together. In the network 120, there is a path 130 that traverse the recovery domains A-F, 125a-125f. FIG. 1B shows a fault 135 in the path 130 between the recovery domain C 125c and recovery domain D 125d. Because there is no overlap in recovery domains in the network 120, a recovery path 140 is established between the recovery domain C 125c and recovery domain D 125d to recover the fault 135. Other recovery paths 145 and 150 are established between the recovery domain A 125a and recovery domain C 125c, and between the recovery domain D 125d and recovery domain F 125f, respectively, to recover the fault 135. Recovery signaling 118 may be transmitted among the recovery domains A-FIG. 125a-125f over one or more paths.

Figure 1C:
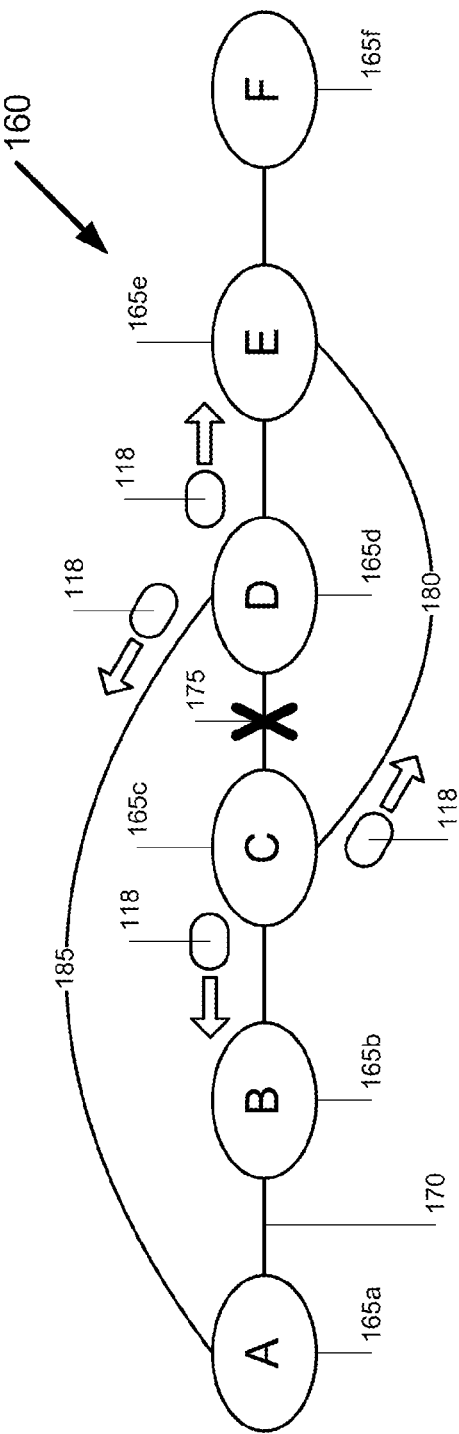

FIG. 1C also shows a network of recovery domains 160 organized in a series In the network 160, recovery domains A-F, 165a-165f, are concatenated together with an overlap in recovery domains. In the network 160, there is a path 170 traversing the recovery domains A-F, 165a-165f. FIG. 1C shows a fault 175 in the path 170 between the recovery domain C 165c and recovery domain D 165d. Because of the overlap in recovery domains in the network 160, both the recovery domain A 165a and recovery domain C 165c can repair a portion of the path 170 that is affected by the fault 175. For example, the recovery domain C 165c can try first and establish a recovery path 180 between the recovery domain C 165c and recovery domain E 165e to recover from the fault 175. Recovery domain A 165a can try next and establish another recovery path 185 when the recovery domain C 165c is unable to recover the fault 175. Like FIG. 1B, the recovery signaling 118 can be sent over one or more paths to the recovery domains A-F, 165a-165f.

When more than one protection/restoration or recovery technique is used at the same time over the same path or portion of a path, coordinating the different actions to avoid adverse interactions, such as flapping, repeated hits to traffic, etc., can provide efficiency to the restoration or recovery. For example, referring to FIG. 1C, both the recovery domain A 165a and recovery domain C 165c can both repair (or restore) a portion of the path 170 affected by the fault 175. Without any coordination between the recovery domain A 165a and recovery domain C 165c (or among three or more recovery domains in other examples), work may be duplicated. Further, it is possible that recovery efforts done by one recovery domain may be undone by another.

Presented below are example embodiments for coordinating fault recovery techniques for one or more recovery domains. These embodiments are discussed in the context of a network of recovery domains that are organized into a hierarchy of parent and child recovery domains (also referred to as "nested recovery domains") as described in reference to FIG. 1A. But, these embodiments also apply to recovery domains organized in various other ways, such as in a series with no overlapping recovery domains (described in reference to FIG. 1B) and in a series with overlapping recovery domains (described in reference to FIG. 1C).

Figure 2:
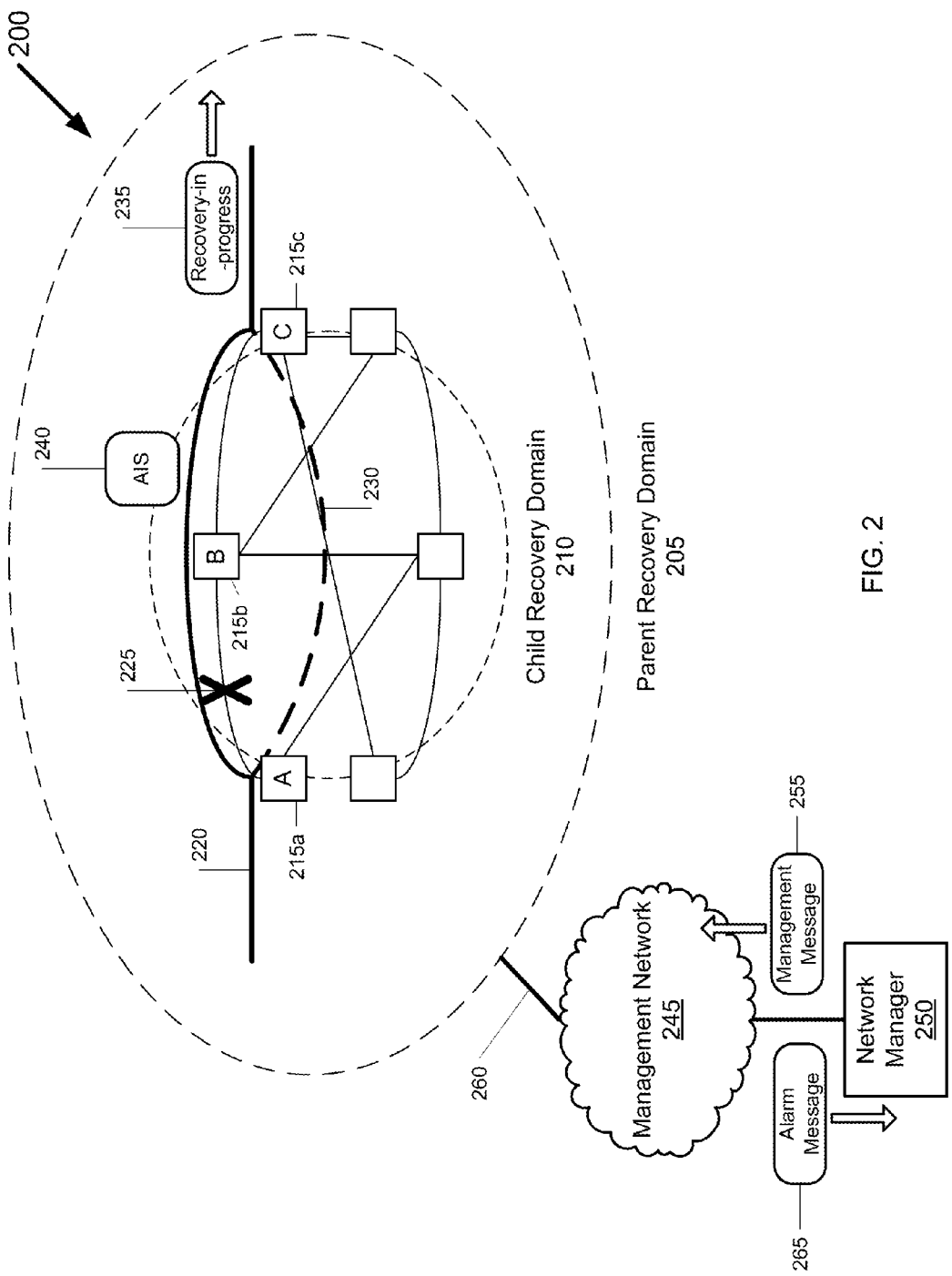
FIG. 2 is a network diagram of an example network of recovery domains, organized in a hierarchy, communicatively coupled to a management network in accordance with an embodiment of the present invention.

FIG. 2 shows a network of recovery domains 200 organized in a hierarchy. The network 200 includes a parent recovery domain 205 and child recovery domain 210 in a parent-child relationship. That is, the parent recovery domain 205 is the parent of the child recovery domain 210, and the child recovery domain 210 is child of the parent recovery domain 205.

The child recovery domain 210 has nodes including nodes A-C, 215a-215c. The nodes of the child recovery domain 210 may be internetworked and communicating with each other and to other nodes (e.g., in another recovery domain) using a number of various technologies, such as Optical Transport Network (OTN), Synchronous Optical Network (SONET)/Synchronous Digital Hierarchy (SDH), and Multiprotocol Label Switching-Transport Profile (MPLS-TP). These nodes may be arranged in one of many different network topologies, such as linear, ring, and mesh networks.

In the network 200, there is a path 220. The path 220 passes through the child recovery domain 210. In particular, nodes A-C, 215a-215c, are on the path 220. The child recovery domain 210 (in particular, nodes A-C, 215a-215c) can recover a fault occurring on a portion of the path 220 that passes through the child recovery domain 210.

Because of the parent-child relationship in which the parent recovery domain 205 is the parent of the child recovery domain 210, the path 220 also passes through the parent recovery domain 205. It may be said that the parent recovery domain 205 contains the path 220. This means that the parent recovery domain 205 can also recover a fault occurring on the portion of the path 220 that passes through the child recovery domain 210.

To avoid the parent recovery domain 205 and the child recovery domain 210 both trying to recover a fault, prior fault recovery techniques or mechanisms rely on using hold-off timers. After detecting a fault, a recovery domain would hold or wait for a period time (typically 50 milliseconds, but other times are possible) before taking action to recover the fault. The amount of time waiting would be sufficiently long to allow the fault to be recovered, hypothetically, by another recovery domain. Once this hold-off timer expires, if the recovery domain still detects the fault, then the recovery domain would take action to recover the fault.

There are several disadvantages of a recovery mechanism that uses a hold-off timer to prevent concurrent action by multiple recovery domains. Using this simple timer-based coordination technique, the time to recover a fault or "recovery time" in a domain that has a hold-off timer will always be increased by the hold-off time, even if that domain is the only one that can perform the recovery. As an example, with nested recovery domains, the hold-off timer for a parent recovery domain is set based on "worst-case" recovery time for a child recovery domain. In some situations or applications, having to wait for 50 milliseconds (a typically value of a hold-off timer) to correct a fault is too long and disrupts service. The result may be service outages that are costly in terms of money and customer satisfaction.

Another disadvantage of a timer-based recovery mechanism is that it is not possible to allow concurrent recovery by multiple recovery domains when it is advantageous and not detrimental.

Continuing to refer to FIG. 2, a portion of the path 220 (between node A 215a and node B 215b) is shown as having a fault 225. The child recovery domain 210 takes action to recover the fault 225. In particular, FIG. 2 shows a recovery path 230 established between node A 215a and node C 215c. The recovery path 230 may be preconfigured or established dynamically.

To coordinate recovery in a network of recovery domains, one embodiment notifies a first recovery domain that the second recovery domain is or is not taking action to recover a fault in the network. For example, in the network 200, an example embodiment notifies the parent recovery domain 205 (i.e., a first recovery domain) of the child recovery domain 210 (i.e., a second recovery domain) that the child recovery domain 210 is taking action to recover the fault 225.

The coordinated recovery technique, described in the paragraph above (and described below in reference to other example embodiments) offers several advantages over timer-based recovery techniques. One advantage is a quicker recovery time. With the inventive coordinated recovery technique, a fault can be recovered in less time than the hold-off timer of a timer-based recovery technique. Another advantage is concurrent action by multiple recovery techniques is allowed. With the inventive coordinated recovery technique, a first recovery domain may take action even when notified of a second domain taking action. Other advantages will become evident as other embodiments are described below.

In a convenient embodiment, notifying the parent recovery domain 205 of a recovery in progress includes inserting a recovery-in-progress signal in a maintenance message. The signal may be defined in a data or bearer plane that is used for coordinating protection/restoration (recovery) along a given path. In a network of multiple recovery domains (e.g., the network 200 of FIG. 2), this signal is inserted at the edge of a recovery domain when the recovery domain is actively working on a protection/restoration (recovery) procedure and removed when that recovery domain is no longer working on the procedure. The signal may be used by other protection/restoration (recovery) domains to determine what action they should or should not take. These protection/restoration (recovery) domains may be within the same network layer or in different network layers. For example, in the network 200, an example embodiment inserts a recovery-in-progress signal 235 in a maintenance message to notify the parent recovery domain 205 that the child recovery domain 210 is taking action to recover the fault 225.

Details about inserting a recovery-in-progress signal in a maintenance message, according to example embodiments, are described later in greater detail in reference to FIGS. 9A and 9B.

In the network 200, one or more nodes along the path 220 may detect the fault 225 and issue an alarm indication signal (AIS) 240 or similar signal. As FIG. 2 shows, fault recovery includes node C 215c participating in switching from the portion of the path 220 that includes the fault 225 to the recovery path 230. Thus, node C 215c may be aptly called a "switching node."

Using FIG. 2 as an example in which node C 215c receives the AIS 240. In one embodiment, the recovery-in-progress signal 235 is applied in response to node C 215c (switching node) receiving the AIS 240. In another example, node C 215c detects the fault 225, either directly or indirectly (e.g., by way of node B 215b). According to another embodiment, the recovery-in-progress signal 235 and AIS 240 are applied in response to node C 215c (switching node) detecting (directly or indirectly) the fault 225.

According to an example embodiment, notifying the first recovery domain of a recovery in progress is done by way of an in-band signal that takes the same path that includes a fault, such as the path 220 of FIG. 2. In other embodiments, notifying the first recovery domain of a recovery in progress may done by way of an out-of-band signal that takes a path different from a path that includes a fault.

Still referring to FIG. 2, the figure also shows a management network 245 and a network manager (or network management system) 250. Each node of the network 200 has a management interface or port to connect the node to the management network 245 and the network manager 250. This connectivity enables the network manager 250 to manage the network 200 and its nodes over the management network 245, and to perform tasks related to fault, configuration, accounting, performance, and security, for example. Management of the network 200 and its nodes by the network manager 250 may be carried out in the form of signals and/or messages, such management and maintenance messages. These signals and/or messages may be carried over a path (represented in FIG. 2 as path 260) that is different from the path 220. Because these signals and/or messages take a different path, they are called "out-of-band signals."

According to one embodiment, the parent recovery domain 205 is notified of a recovery in progress by an out-of-band signal from the network manager 250. For example, as shown in FIG. 2, the network manager 250 sends a management message 255, out-of-band, over the path 260. The management message 255 may instruct a node in the network 200 to insert a signal, such as the recovery-in-progress signal 235. The management message 255, itself may be or include a signal, such as the recovery-in-progress signal 235. The network manager 250 may send the management message 255 in response to receiving an alarm message 265. The alarm message 265 may be sent to the network manager 250 (or network management system) as a result of detecting the AIS 240 or other data plane anomalies.

Figure 3A:
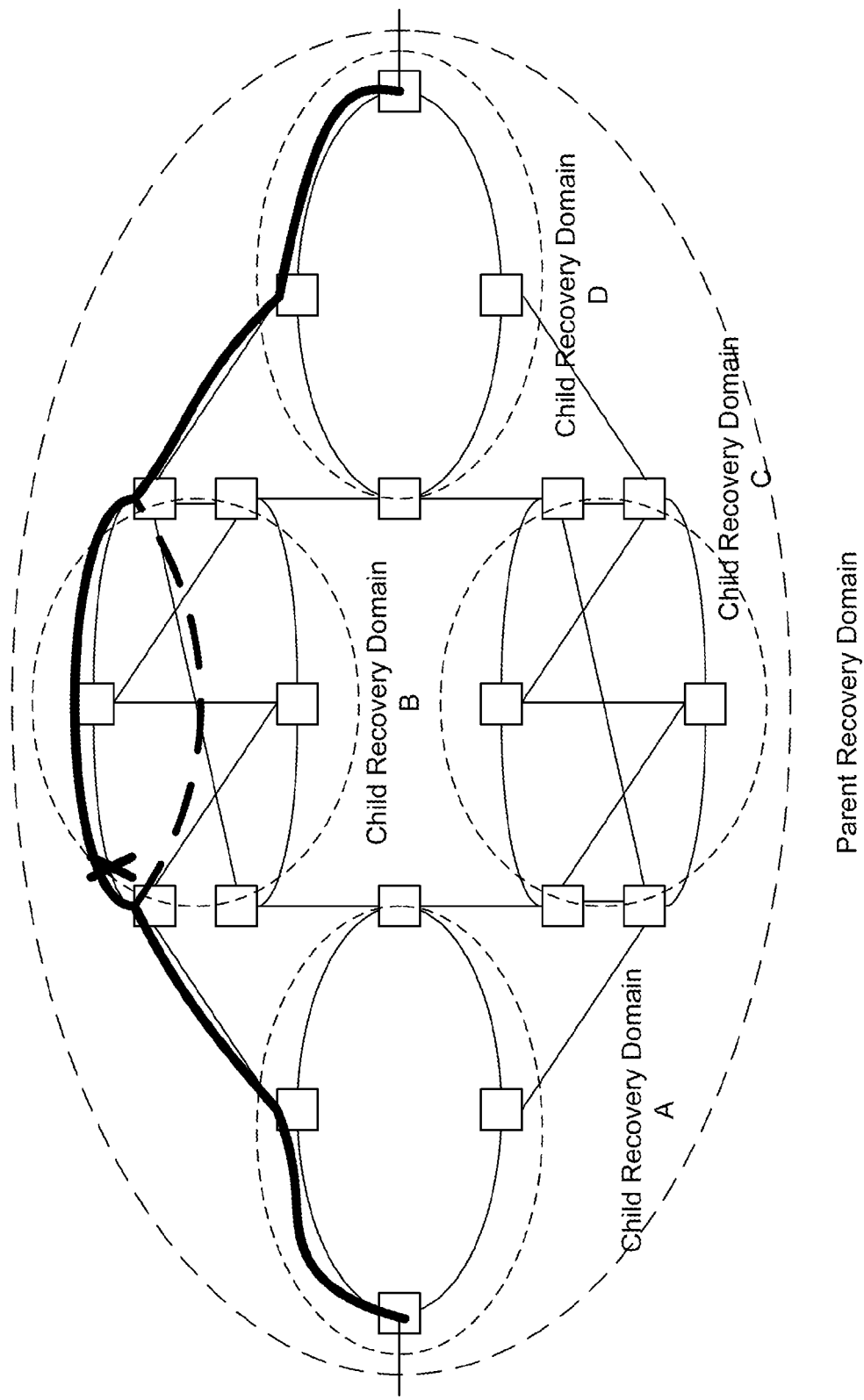
FIGS. 3A-3C are network diagrams of example networks of recovery domains, organized in a hierarchy, in which fault(s) occur and recovery from the fault(s) are coordinated in accordance with embodiments of the present invention.

In FIG. 3A, when a fault (or failure) occurs inside of any one of the four inner recovery domains, then a recovery domain containing the fault (child recovery domain B in FIG. 3A) can protect the connection (using a path shown with the dashed line). In this case, the recovery domain taking the protection/restoration (recovery) action inserts the signal indicating that it is taking action to restore the connection. As a result, the other recovery domain need not respond to the fault. In some cases, the other recovery domain waits for the connection to be restored.

Figure 3B:
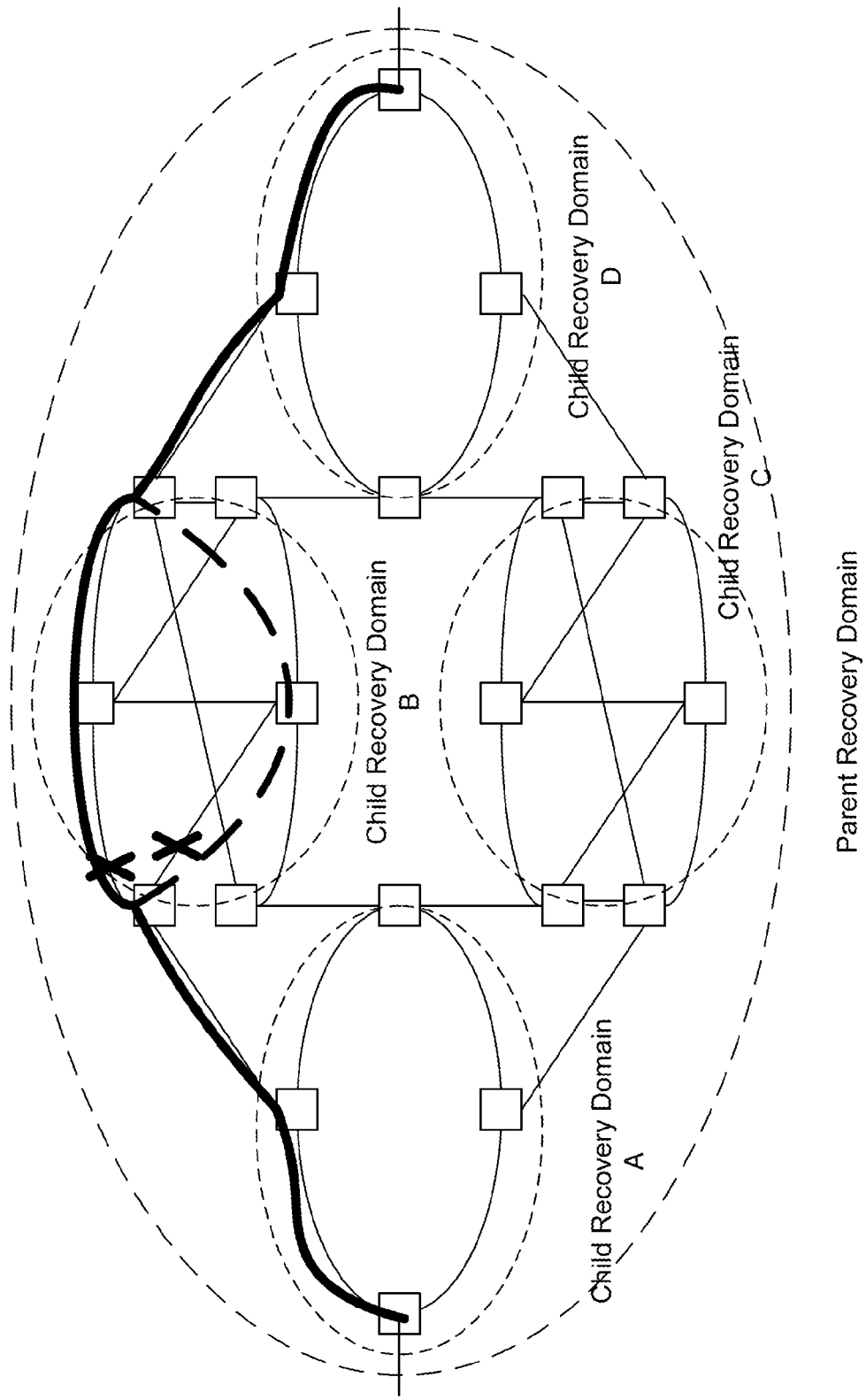

In FIG. 3B, when two faults occur inside a single recovery domain, it may not be possible for that recovery domain to restore the service (child recovery domain B in FIG. 3B). In this case, child recovery domain B cannot restore the service, but parent recovery domain may be able to do so. None of the nested recovery domains (child recovery domains A-C) insert the signal indicating that it is working to restore (recover) the connection. In the absence of the signal, parent recovery domain knows that it should act to restore (recover) the connection. Unlike prior recovery techniques, according to the example embodiment of the present invention of FIG. 3B, there is no need to wait for a hold-off timer to expire before taking action.

Figure 3C:
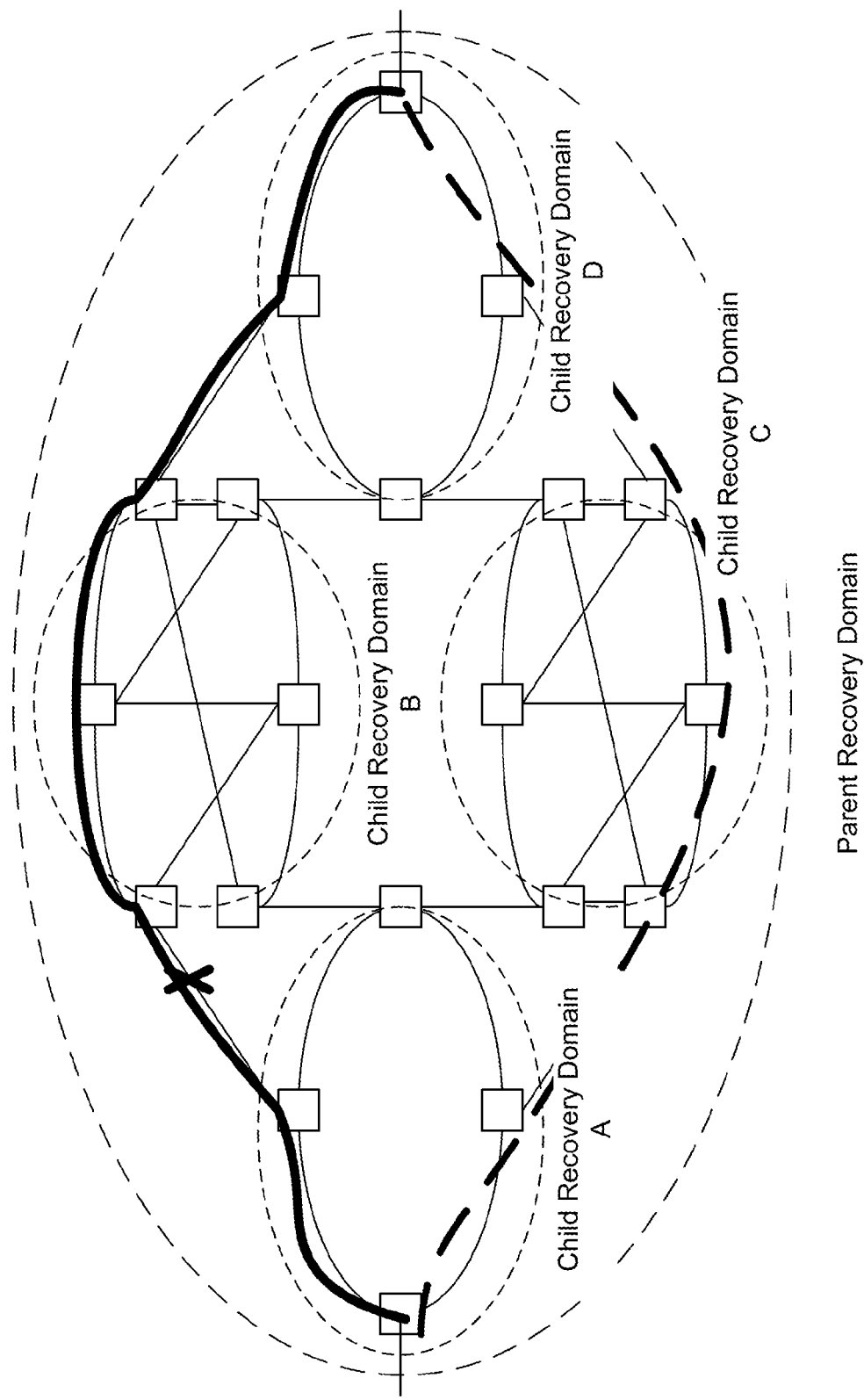

In FIG. 3C, when a fault occurs between nested recovery domains (child recovery domains A and B in FIG. 3C), only parent recovery domain is able to restore (recover) the connection (shown in FIG. 3C as a dashed line). None of the nested recovery domains (child recovery domains A-C) insert a signal indicating that it is working to restore the connection. In the absence of the signal, parent recovery domain knows that it should act to restore (recover) the connection. Unlike prior recovery techniques, according to the example embodiment of the present invention of FIG. 3C, there is no need to wait for a hold-off timer to expire before taking action.

Figure 4:
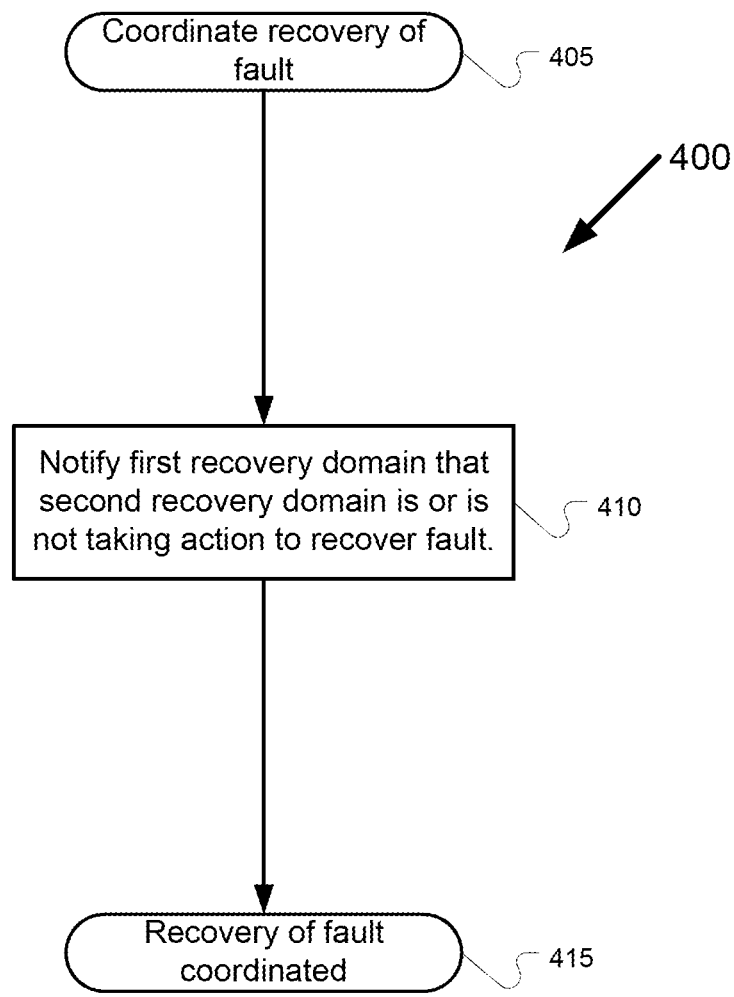
FIG. 4 is a flow diagram of an example procedure for coordinating recovery in a network in accordance with an embodiment of the present invention.

FIG. 4 shows an example procedure 400 for coordinating recovery in a network according to an embodiment. The procedure 400 starts 405. The procedure 400 notifies 410 a first recovery domain that a second recovery domain is or is not taking action to recover a fault in the network.

In the procedure 400, the first and second recovery domains may be organized in one of several different network arrangements. For example, the first and second recovery domains may be arranged into a hierarchy of recovery domains, such as the network 100 of FIG. 1A. In such a type of network, the first recovery domain is a parent of the second recovery domain, and the second recovery domain is a child of the first recovery domain. In this arrangement of recovery domains, the domains are aptly named "parent recovery domain" and "child recovery domain."

The first and second recovery domains may be concatenated into a series of recovery domains, such as in network 120 of FIG. 1B. The first and second recovery domains may also be concatenated into a series of recovery domains in which at least two recovery domains overlap with each other, such as in the network 160 of FIG. 1C.

The procedure 400 may notify 410 the first recovery domain of a recovery in progress in a number of ways. Consider the following example in reference to FIG. 2. The network 200 includes the parent recovery domain 205 (a first recovery domain) and the child recovery domain 210 (a second recovery domain). In the network 200, the path 220 includes the fault 225. In one embodiment, the procedure 400 notifies 410 the parent recovery domain 205 of a recovery in progress by inserting a recovery-in-progress signal into a maintenance message, such as the message 235 of FIG. 2.

In another embodiment, the procedure 400 notifies 410 the parent recovery domain 205 of a recovery in progress by notifying that the child recovery domain 210 is taking action to recover the fault 225 within the child recovery domain 210.

In yet another embodiment, the procedure 400 notifies 410 the parent recovery domain 205 of a recovery in progress by notifying the parent recovery domain 205 by way of an in-band signal. The in-band signal takes the same path as the path that includes the fault. For example, in FIG. 2, the message 235 (an example of an in-band signal) takes the path 220 that includes the fault 225. Of course, if the fault 225 is one that disrupts passage of signaling (e.g., when a fiber is cut), the message 235 takes the path 220 in span(s) between nodes that do not contain the fault 225.

In still yet another embodiment, the procedure 400 notifies 410 the parent recovery domain 205 by notifying the parent recovery domain 205 by way of an out-of-band signal that takes a path different from a path that includes the fault. For example, in FIG. 2, the message 255 (an example of out-of-band signal) takes the path 260 that is different from the path 220 that includes the fault 225. An out-of-band signal may come from a network manager. For example, in FIG. 2, via the management network 245, the network manager 250 sends the message 255.

The procedure 400 may operate across multiple recovery domains. For example, the procedure 400 may be running as a separate procedure in each of the recovery domains. Each respective procedure 400 starts 405 and notifies 410 a first recovery domain that a second recovery domain is or is not taking action to recover a fault, as described above. In an example embodiment, the procedure 400 operates across at least two different technologies of recovery domains. These technologies include: Optical Transport Network (OTN), Synchronous Optical Network (SONET)/Synchronous Digital Hierarchy (SDH), and Multiprotocol Label Switching-Transport Profile (MPLS-TP), just to name a few examples. While example embodiments of the present invention are described with reference to OTN, SONET/SDH, and MPLS-TP, it should be readily apparent to those skilled in the art that these and other embodiments can be extended to other networking technologies including connection-oriented ones like Ethernet. In another example embodiment, the procedure 400 operates across at least two different network topologies of recovery domains including: linear, ring, and mesh.

A coordinating recovery procedure (not shown), according to a convenient embodiment, may also apply an indication related to notifying the first recovery domain (described above in reference to FIG. 4, block 410) to a policy (or a policy to an indication) to determine whether the first recovery domain is to take action. For example, according to the policy (and a result of applying the indication), the first recovery domain may ignore the fact that the second recovery domain is taking action and then take action itself.

Other examples of policies that may be carried out upon receiving a recovery-in-progress signal include: i) delay any local protection/restoration action to protect/restore a service in question while the recovery-in-progress signal is being asserted, ii) delay any local protection/restoration action for a particular amount of time, and then initiate such protection/restoration action if service is still not restored, iii) ignore the recovery-in-progress signal and perform protection/restoration, and iv) ignore the recovery-in-progress signal and perform protection/restoration, and further, via management or control plane, undo any protection action performed by a child recovery domain.

According to other embodiments, a recipient of a recovery-in-progress signal is not bound to make use of the information conveyed by the recovery-in-progress signal. In these embodiments, the recovery-in-progress signal is one more piece of information that is available to help the recipient decide how to respond to a fault (failure) detected by the recipient.

According to another convenient embodiment, a coordinating recovery procedure (not shown) may also apply a recovery-in-progress signal to a policy, or vice-versa, in response to an alarm indication signal (AIS) received. A switching node within the second recovery domain (like node C 215c of FIG. 2) may receive the AIS.

According to yet another convenient embodiment, a coordinating recovery procedure (not shown) may also detect the fault and apply an alarm indication signal (AIS) and recovery-in-progress signal. The fault may be detected at a switching node within the second recovery domain, such as node C 215c of FIG. 2.

Figure 5:
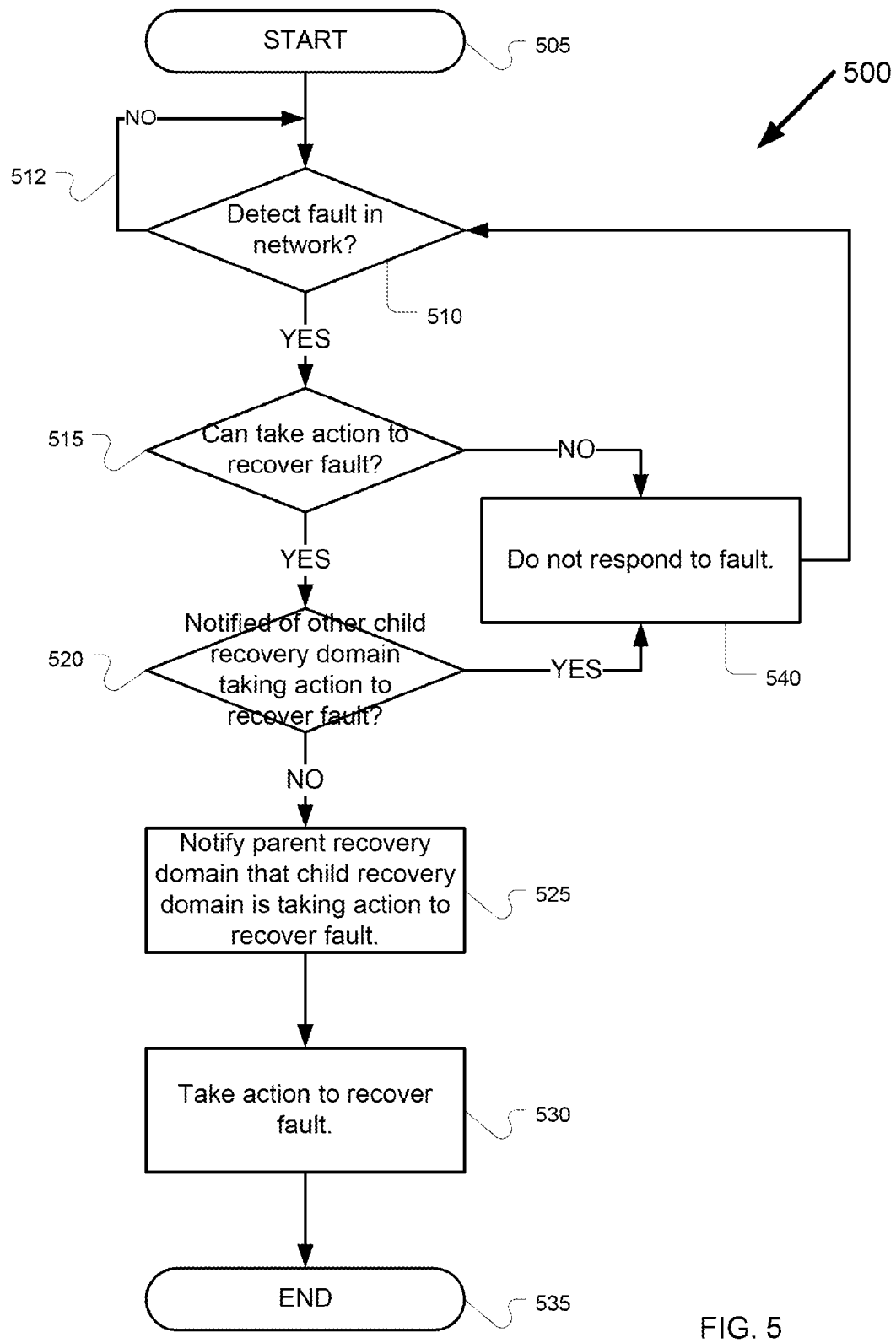
FIG. 5 is a flow diagram of a child-level recovery procedure being coordinated in accordance with embodiments of the present invention.

FIG. 5 shows an example child-level recovery procedure 500. In a network of parent and child recovery domains, the procedure 500 may be running as a separate procedure in each of the child recovery domains, such as the child recovery domains A-D, 110a-110d, of FIG. 1A.

The procedure 500 of the subject child recovery domain starts at 505. When the procedure 500 detects 510 a fault in the network, the procedure 500 then determines 515 whether action can be taken to recover the fault. Absent a fault, the procedure 500 waits 512 to detect a fault in the network.

The procedure 500 having detected a fault, then determines 515 whether action can be taken to recover the fault. Before any action is taken, the procedure 500 first checks 520 whether it has been notified of another child recovery domain taking action to recover the fault.

Unless notified of another child recovery domain taking action, the procedure 500 of the subject child recovery domain continues. The procedure 500 notifies 525 the parent recovery domain that the subject child recovery domain is taking action to recover the fault. The procedure 500 then takes action 530 to recover the fault.

Returning back to decision block 515, if the procedure 500 determines no action can be taken to recover the fault, the procedure 500 does not respond to the fault 540. If the procedure 500 of the subject child recovery domain determines 515 that action can be taken to recover the fault and determines 520 that it is notified of another child recovery domain taking action to recover the fault, then the procedure 500 does not react to knowledge of the fault 540.

While FIG. 5 shows the procedure 500 ending at 535, the procedure 500 may be a continuously running procedure. After the procedure 500 reaches and completes block 530 (i.e., take action to recover fault) or block 540 (i.e., do not respond to fault), the procedure 500 may return to decision block 510 and wait to detect another fault in the network.

Figure 6:
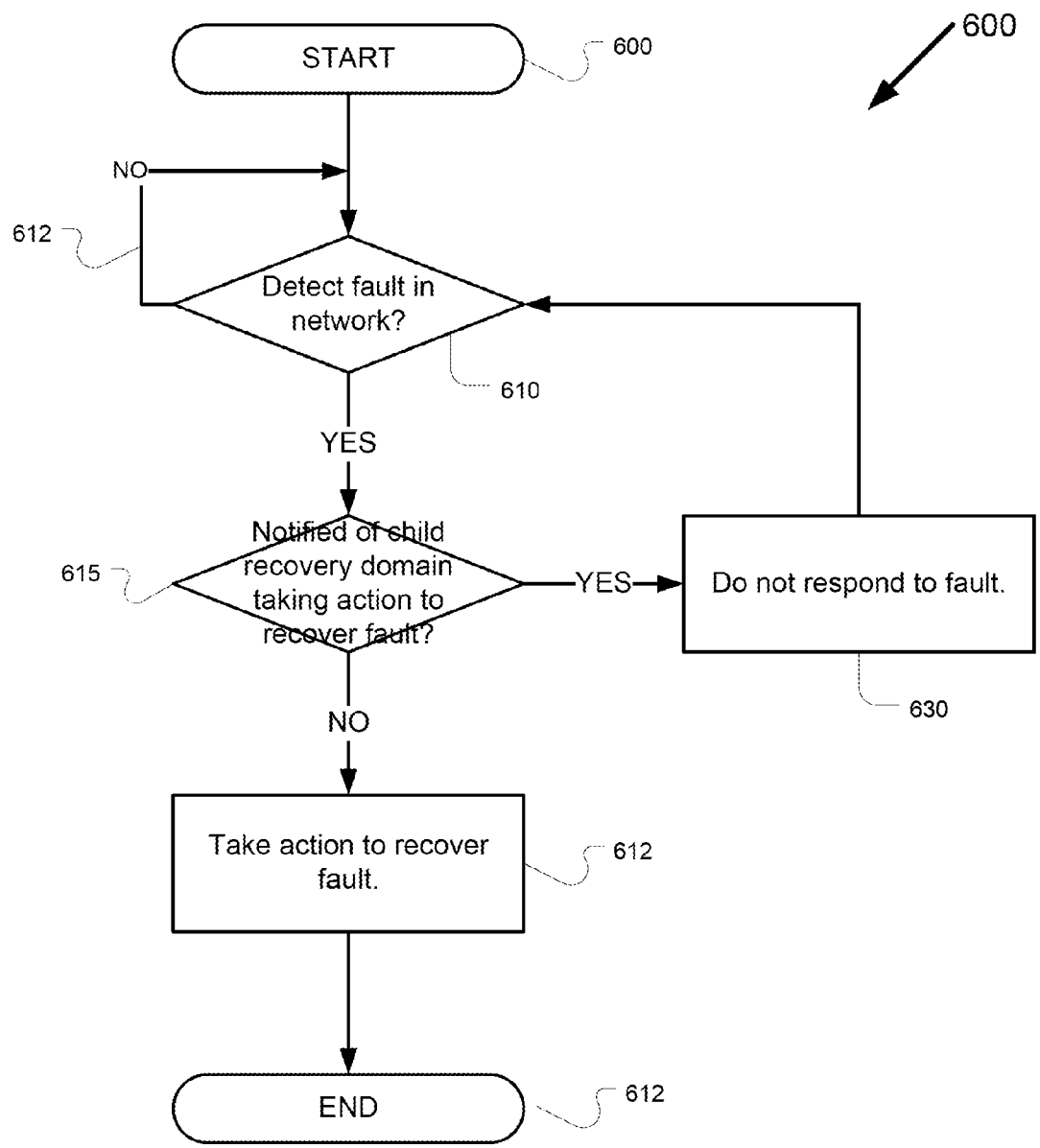
FIG. 6 is a flow diagram of a parent-level recovery procedure being coordinated in accordance with embodiments of the present invention.

FIG. 6 shows an example parent-level recovery procedure 600. In a network of parent and child recovery domains, the procedure 600 may be running as a procedure in the parent recovery domain, such as the parent recovery domain 105 of FIG. 1A.

The procedure 600 starts at 605. When the procedure 600 detects 610 a fault in the network, the procedure 600 then determines 615 whether it has been notified of a child recovery domain taking action to recover the fault. Absent a fault, the procedure 600 waits 612 to detect a fault in the network.

When the procedure 600 determines 615 that a child recovery domain is taking action to recover the fault, the procedure 600 then takes action 620 to recover the fault.

Returning back to decision block 615, if the procedure 600 determines that it has been notified of a child recovery domain taking action to recover the fault, then the procedure 600 does not respond to the fault 630.

While FIG. 6 shows the procedure 600 ending at 625, the procedure may be a continuously running procedure. In such an embodiment, after the procedure 600 reaches and completes block 620 (i.e., take action to recover fault) or block 630 (i.e., do not respond to fault), the procedure 600 returns to decision block 610 and waits to detect another fault in the network.

Figure 7:
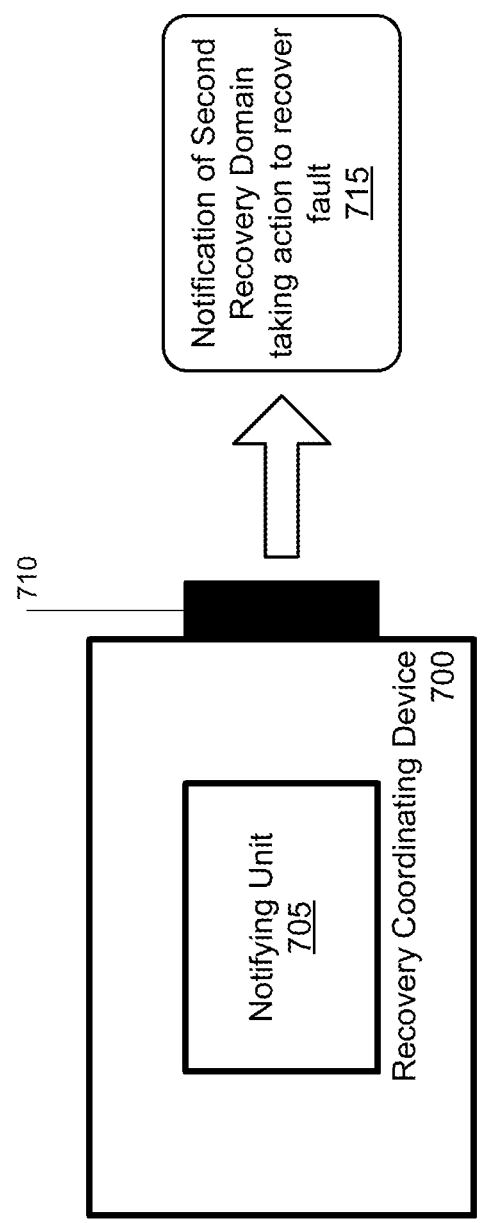
FIG. 7 is a block diagram of an example coordinating device in accordance with an embodiment of the present invention.

FIG. 7 shows an example recovery coordinating device 700 to coordinate fault recovery in a network having first and second recovery domains. The device 700 includes a notifying unit 705 communicatively coupled an interface 710, which, in turn, is communicatively coupled to the network.

The notifying unit 705 is configured to notify the first recovery domain that the second recovery domain is or is not taking action to recover a fault, as described above in reference to FIGS. 2 and 4. The interface 710, in turn, provides a notification 715 that the second recovery domain is taking action to recover the fault. In some embodiments, described below, the notification 715 may be a signal, message, or signal in a message.

In one embodiment, the notifying unit 705 is further configured to insert a recovery-in-progress signal into a maintenance message. The interface 710, in turn, provides the maintenance message with the signal (i.e., the notification 715) to the first recovery domain.

In another embodiment, the notifying unit 705 is further configured to notify that the second recovery domain is taking action to recover the fault within the second recovery domain.

In yet another embodiment, the notifying unit 705 is further configured to notify the first recovery domain by way of an in-band signal that takes the same path as the path that includes the fault. In such an embodiment, the interface 710 is configured to provide the notification 715 over the same path that includes the fault.

In still yet another embodiment, the notifying unit 705 is further configured to notify the first recovery domain by way of an out-of-band signal that takes a path different from a path that includes the fault. In this embodiment, the interface 710 is further configured to provide the notification 715 over the path different from the path that includes the fault. For example, the recovery coordinating device 700, through the interface 710, is in communication with a management network (e.g., the management network 245 of FIG. 2) that is separate and distinct from the network.

In other example embodiments (not shown) of the recovery coordinating device 700, the interface 710 is further configured to receive a fault indication, alarm indication signal (AIS), and/or indication of a second recovery domain taking action to recover a fault. The device 700 may also have one or more other interfaces configured to receive these indications. In one of these embodiments, the device 700 responds to a received AIS and sends a recovery-in-progress signal to the network. In another embodiment, the device 700 responds to a received fault indication and sends an alarm indication signal (AIS) and recovery-in-progress signal to the network. In yet another embodiment, the device 700 responds to a received indication of a second recovery domain taking action to recover a fault by not responding to the fault.

The recovery coordinating device 700 may be a physical node in the network, like nodes A-C, 215a-215c, of FIG. 2, or other network devices, such as a switch, router, or optical transport system. The device 700 may be part of a physical network node as a component, module, blade or card of that node.

Alternatively, the recovery coordinating device 700 may be a general purpose computer having a processor, memory, communication interface, etc. (described in greater detail below in reference to FIG. 8). The general purpose computer is transformed into the recovery coordinating device 700 and its components, for example, by loading instructions into the processor that cause the computer to notify a first recovery domain that a second recovery domain is or is not taking action to recover a fault in the network.

Figure 8:
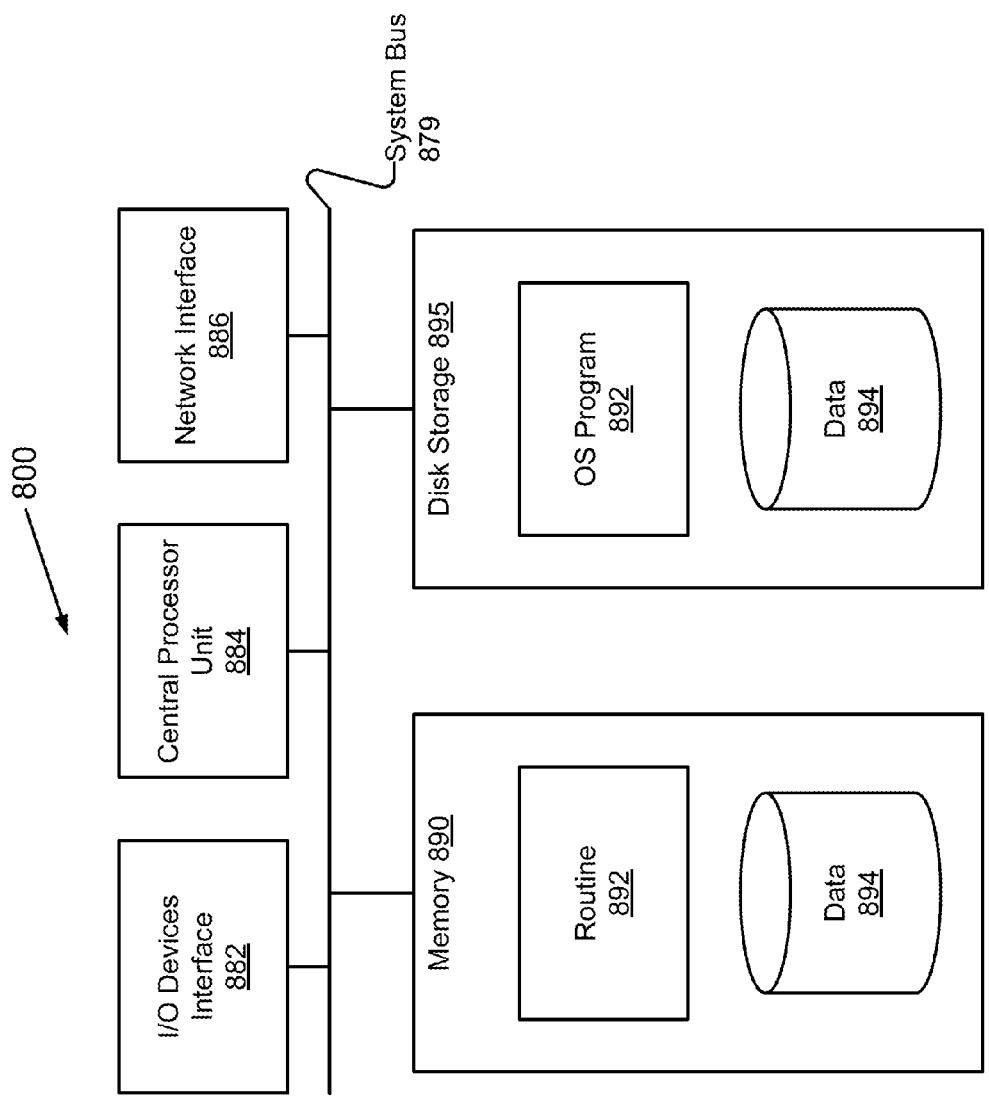
FIG. 8 is an example computer implementing embodiments of the present invention.

FIG. 8 is a block diagram of the internal structure of a computer 800 in which various embodiments of the present invention may be implemented. The computer 800 contains system bus 879, in which a bus is a set of hardware lines used for data transfer among the components of a computer or processing system. Bus 879 is essentially a shared conduit that connects different elements of a computer system (e.g., processor, disk storage, memory, input/output ports, network ports, etc.) that enables the transfer of information between the elements. Attached to system bus 879 is I/O device interface 882 for connecting various input and output devices (e.g., keyboard, mouse, displays, printers, speakers, etc.) to the computer 800. Network interface 886 allows the computer 800 to connect to various other devices attached to a network (e.g., the network 200 of FIG. 2 or the management network 245 of FIG. 2). Memory 890 provides volatile storage for computer software instructions 892 and data 894 used to implement an embodiment of the present invention (e.g., the procedure 400 of FIG. 4). Disk storage 895 provides non-volatile storage for computer software instructions 892 and data 894 used to implement an embodiment of the present invention. Central processor unit 884 is also attached to system bus 879 and provides for the execution of computer instructions.

In one embodiment, the processor routines 892 and data 894 are a computer program product (generally referenced 892), including a computer readable medium (e.g., a removable storage medium, such as one or more DVD-ROM's, CD-ROM's, diskettes, tapes, etc.) that provides or stores at least a portion of the software instructions for embodiments of the invention system. Computer program product 892 can be installed by any suitable software installation procedure, as is well known in the art. In another embodiment, at least a portion of the software instructions may also be downloaded over a cable, communication and/or wireless connection.

Further, embodiments of the present invention may be implemented in a variety of computer architectures. The general computer of FIG. 8 is for purposes of illustration and not limitation of any embodiments of the present invention.

Figure 9A:
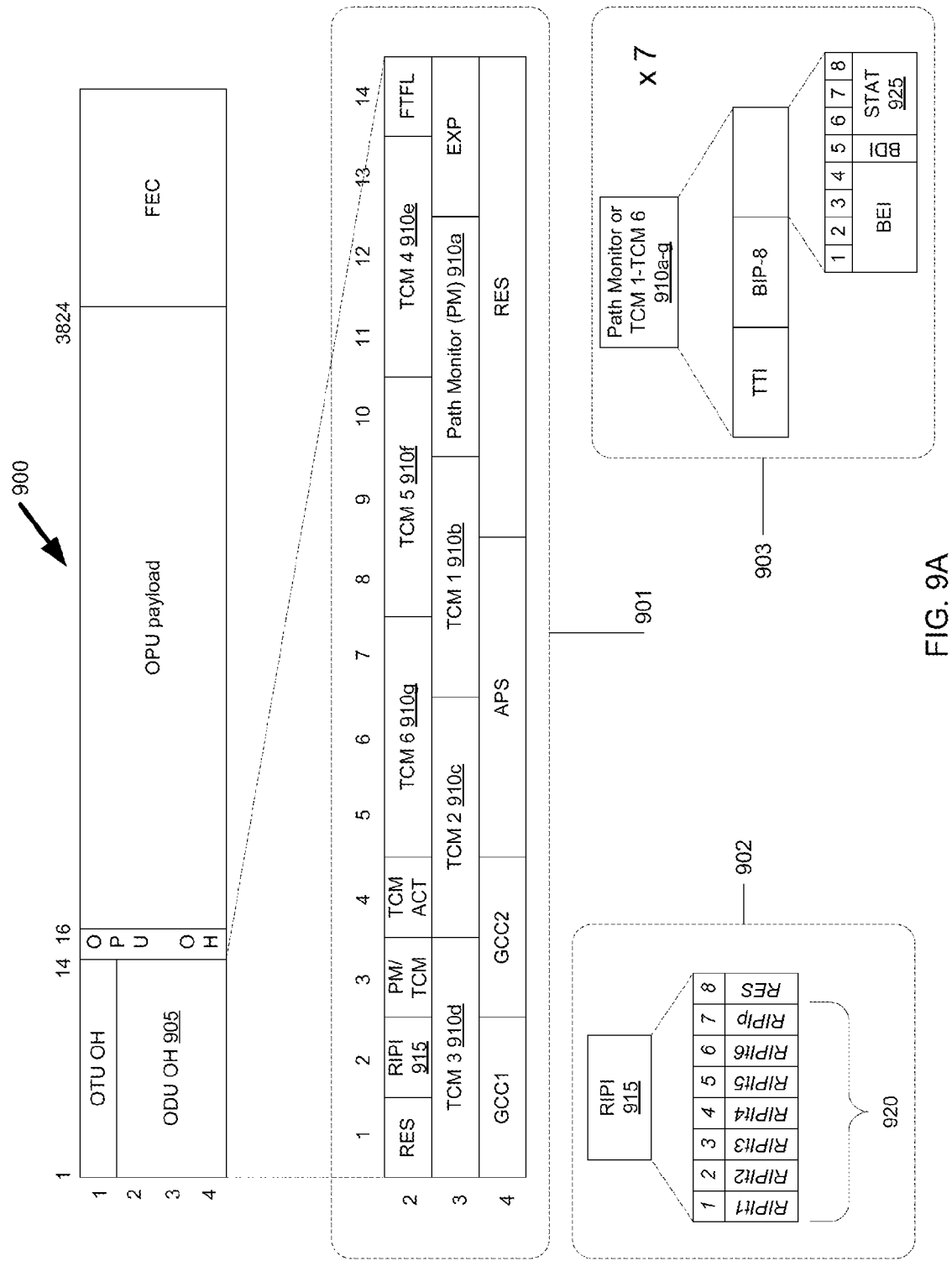
FIGS. 9A and 9B are diagrams of examples in which a recovery-in-progress signal is inserted into a maintenance message in accordance with example embodiments of the present invention.

FIG. 9A shows a frame 900, which is based on the International Telecommunication Union-Standardization sector (ITU-T) G.709 standard describing a means of communicating data over an optical transmission network (OTN). FIG. 9A also provides detail views 901, 902, and 903 showing several elements of the frame 900 in greater detail. In FIG. 9A, numbers above and to the left of the frame 900 (and its elements) are column and row numbers, respectively, identifying bytes of the frame 900.

The frame 900 includes an overhead portion 905. Before describing the overhead portion 905 in greater detail, very briefly, a path, such as the path 115 of FIG. 1, may be monitored in its entirety with path monitoring (PM). Portions of the path, called "tandem paths," which are typically each owned and managed by individual network operators, may be monitored with tandem connection monitoring (TCM). The ITU-T G.709 standard defines six levels of TCM (viz., TCM 1 through TCM 6).

Shown in the detail view 901, the overhead portion 905 includes path monitor bytes 910a used by PM to monitor the entire path, and TCM bytes, viz., TCM 1-TCM 6, 910b-g, used by the six levels of TCM to monitor the tandem paths. The path monitor bytes 910a and TCM bytes 910b-g share the same format, which is described later in reference to the detail view 903. Continuing with the detail view 901, the overhead portion 905 also includes a recovery-in-progress signal or indicator 915 (abbreviated RIPI).

Shown in the detail view 902, the recovery-in-progress signal 915 includes one bit, called a RIPI bit, for the path monitor level and each of the six TCM levels, collectively labeled 920. In operation, some embodiments insert the recovery-in-progress signal 915 by setting the RIPI bit corresponding to a respective TCM level or path monitor level to indicate that one recovery domain or layer has already detected a problem and is working on the problem.

Shown in the detail view 903, each of the path monitor and TCM bytes 910a-g includes a STAT field 925 (seven in total) that indicates the presence of a defect(s) at the path monitor level or at one of the TCM levels. Different bit patterns in the STAT field 925 represent indicators for different defects, for example, alarm indication signal (AIS), open connection indication, and lock signal.

In operation, some embodiments use the STAT field 925 to determine whether AIS (indicator) is present or not. For example, these embodiments read the STAT field 925 carrying a bit value of 111 and determine that AIS is present, and, in response, insert a recovery-in-progress signal. Other embodiments react to defect indicators other than or in addition to AIS. For example, these embodiments insert a recovery-in-progress signal in response to an open connection indication or lock signal.

Figure 9B:
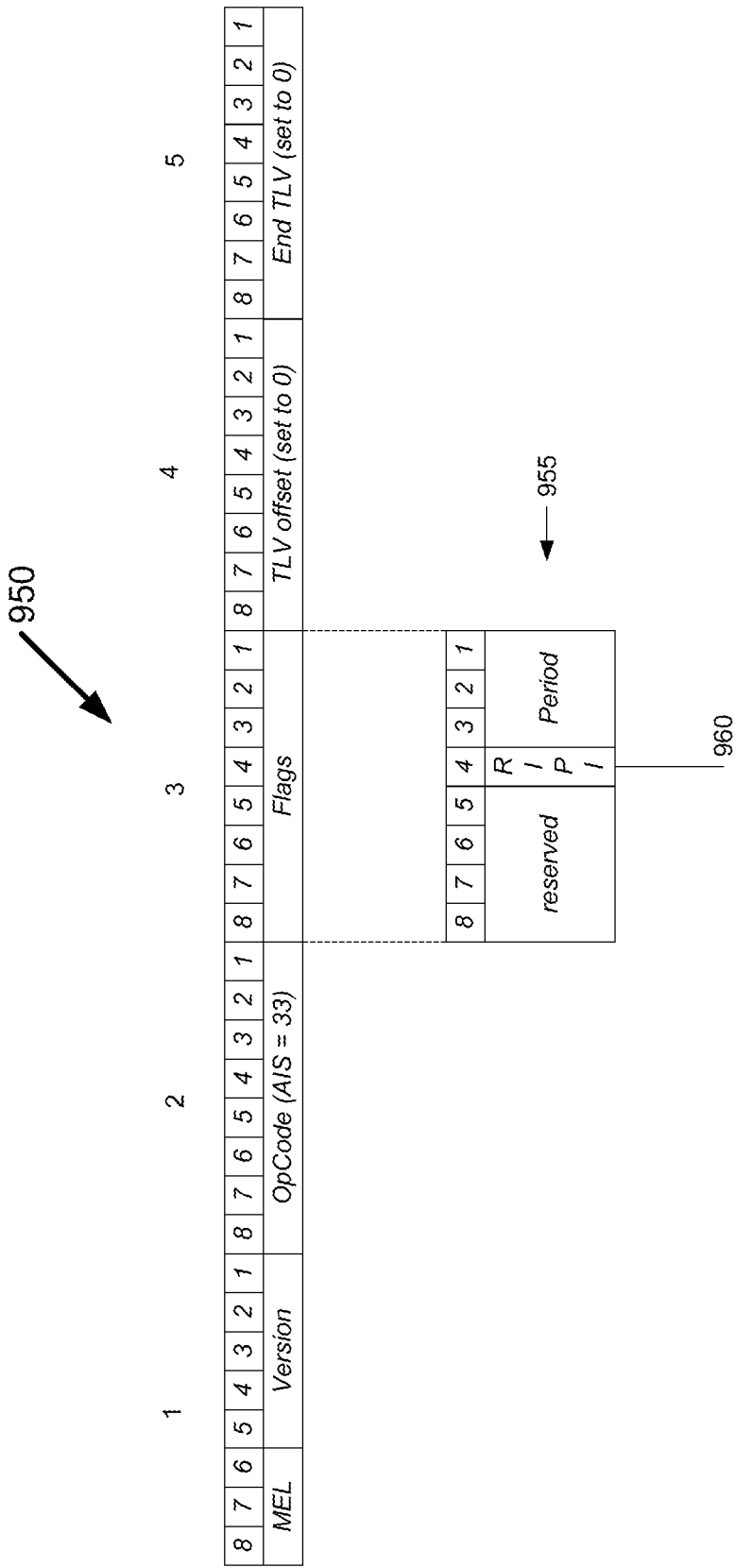

FIG. 9B shows a payload portion 950 of an alarm indication signal protocol data unit (AIS PDU). Header bytes of the AIS PDU, such as Ethernet and Multiprotocol Label Switching-Transport Profile (MPLS-TP) header bytes, are not shown. In FIG. 9B, a row and next row of numbers across the top of the payload portion 950 are byte numbers and bit numbers, respectively. These numbers identify corresponding bytes and bits of the payload portion 950.

The payload portion 950 includes a flags field 955. The flags field 955 includes a recovery-in-progress signal or indicator field (or bit) 960 (abbreviated RIPI). In the example shown in FIG. 9B, the RIPI field 960 in the flags field 955 is used to embed the recovery-in-progress signal in the same PDU as the AIS. The example of FIG. 9B is contrasted with the example of FIG. 9A in which the recovery-in-progress signal 910 and AIS (and other defect indicators) are separate.

As with the example of FIG. 9A, according to other embodiments, other protocol data units (PDUs) that indicate other defect indicators, such as open connection indication and locked signal, are similarly enhanced by including an RIPI bit or field in those PDUs.

Figure 10A:
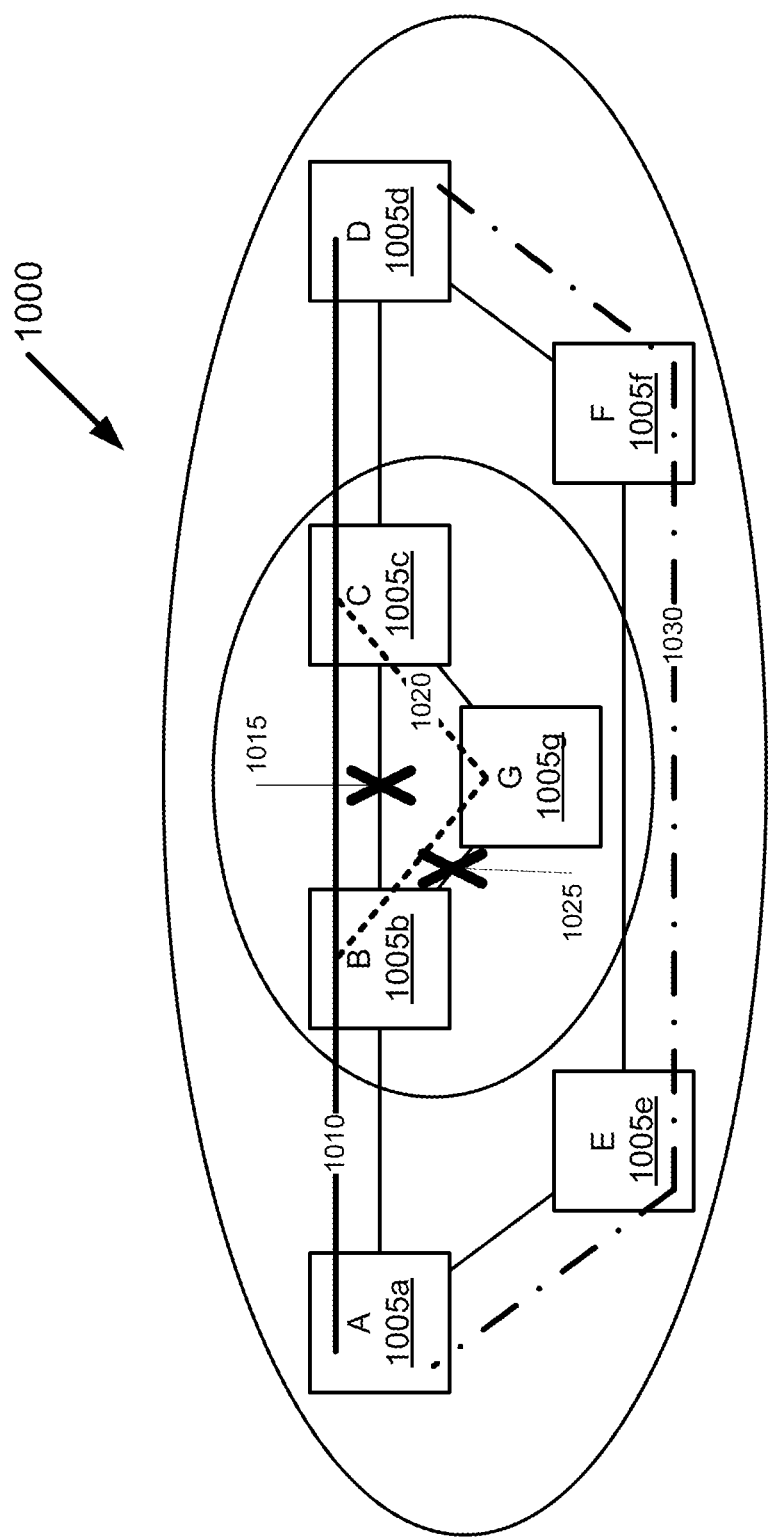
FIG. 10A is a network diagram of an example network of nodes and FIG. 10B is a flow diagram of an example coordinated recovery procedure running on each of the nodes, in accordance with embodiments of the present invention.
Figure 10B:
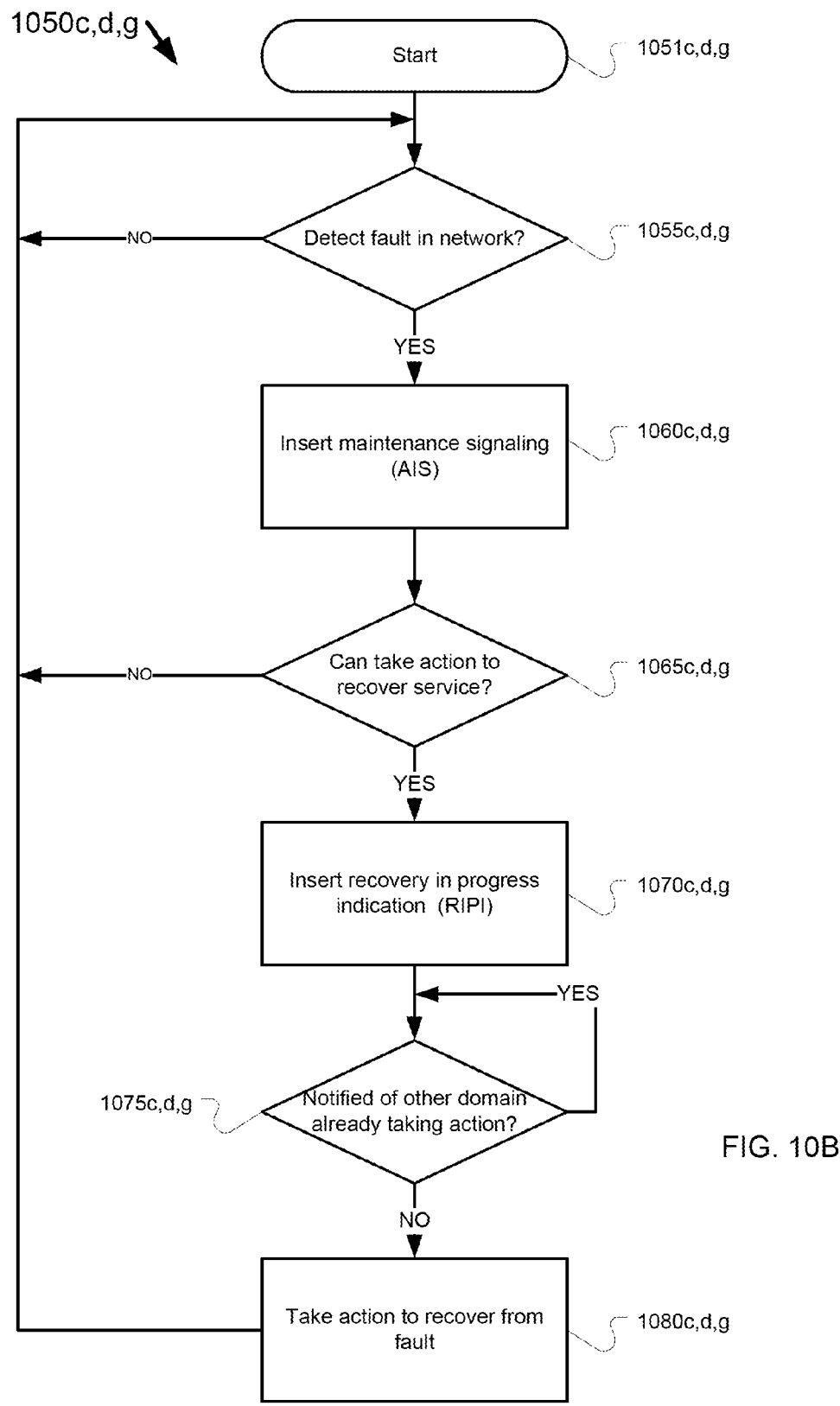

Together FIGS. 10A and 10B show an example of fault recovery coordination according to one or more embodiments. The example demonstrates from a "network level" perspective, multiple nodes in a network coordinating their efforts to recover a fault.

FIG. 10A shows a network 1000 that includes nodes A-G, which are labeled 1005a-1005g. In the network 1000, there is a working circuit or path 1010 (node A 1005a to node B 1005b to node C 1005c to node D 1005d) over which communications are carried. In this example, a fault 1015 occurs and communications cannot be carried between node B 1005b and node C 1005c. In response to the fault 1015, a recovery/protection path 1020 (node B 1005b to node G 1005g to node C 1005c) is established (or switched over) to continue carrying communications.

FIG. 10B shows an example procedure that runs on each of the nodes A-G, 1005a-1005g. The procedures running on the nodes are identical. Procedures running on node C 1005c and node D 1005d are pertinent to the example described above in which the fault 1015 occurs in the network 1000. Accordingly, the procedures running on node C 1005c and node D 1005d are described in detail below.

To describe the procedures in the context of the foregoing example, a procedure and its corresponding blocks running on node C 1005c have reference labels ending in "c" while the same procedure and corresponding blocks running on node D 1005*d* have reference labels ending in "d." Again, the procedures running on the nodes are identical and are only being labeled differently for the sake of describing the procedures in the context of the example.

On node C 1005*c*, the procedure 1050*c* starts (1051*c*) and waits at block 1055*c* to detect a fault. Similarly, on node D 1005*d*, the procedure 1050*d* starts (1051*d*) and waits at block 1055*c* to detect a fault.

The procedure 1050*c* detects (1055*c*) the fault 1015. The procedure 1050*c* inserts (1060*c*) an AIS. The procedure 1050*c* determines (1065*c*) that it can act to recover service. The procedure 1050*c* inserts (1070*c*) a recovery-in-progress indicator (RIPI) (e.g., as described in reference to FIG. 9A).

The procedure 1050*c* takes action (1080*c*) to recover the fault 1015 by initiating a switch to the recovery/protection path 1020 (node B 1005*b* to node G 1005*g* to node C 1005*c*).

In parallel (or substantially in parallel), the procedure 1050*d* running on node D 1005*d* detects (1055*d*) the fault 1015 (e.g., by detecting the AIS inserted by the procedure 1050*c* running on node C 1005*c*). The procedure 1050*d* inserts (1060*d*) an AIS. The procedures 1050*c* and 1050*d* each inserts (1060*c, d*) an AIS at a different layer or domain.

The procedure 1050*d* determines (1075*d*) that action is already being taken (e.g., by detecting the RIPI inserted by the procedure 1050*c* running on node C 1005*c*). The procedure 1050*d* waits at block 1075*d* to take action.

Node B 1005*b* and node C 1005*dc* complete the switch to the recovery/protection path 1020.

The procedure 1050*c* running on node C 1005*c* no longer detects (1055*c*) a fault. The procedure 1050*c* stops inserting (1060*c*) the AIS and stops inserting (1070*c*) the RIPI. The procedure 1050*c* waits at block 1055*c* to detect another fault. The procedure 1050*d* running on node D 1005*d* no longer detects (1055*d*) a fault (e.g., by detecting the absence of an AIS) and waits at block 1055*d* to detect another fault.

Continuing the example above, another fault 1025 occurs and communications cannot be carried between node B 1005*b* and node G 1005*g* on the recovery/protection path 1020. In response to the other fault 1025, another recovery/ protection path 1030 (node A 1005*a* to node E 1005*e* to node F 1005*f* to node D 1005*d*) is established (or switched over) to continue carrying communications.

In addition to the procedures 1050*c* and 1050*d*, a procedure and its corresponding blocks running on node G 1005*g* (labeled with references ending in "g") are pertinent to the continuation of the example. The procedure 1050*g* running on node G 1005*g* is identical to the procedures 1050*c* and 1050*d* running on node C 1005*c* and node D 1005*d*, respectively.

On node G 1005*g*, the procedure 1050*g* starts (1051*g*) and waits at block 1055*g* to detect a fault. The procedure 1050*g* detects (1055*g*) the fault 1025. The procedure 1050*g* inserts (1060*g*) an AIS.

The procedure 1050*c* running on node C 1005*c* detects (1055*c*) the fault 1025 (e.g., by detecting the AIS inserted by the procedure 1050*g* running on node G 1005*g*). The procedure 1050*c* inserts (1060*c*) an AIS. The procedure 1050*c* determines (1065*c*) that it cannot act to recover service. Because the procedure 1050*c* cannot take action, it does not insert an RIPI. Instead, the procedure 1050*c* returns to block 1055*c* and waits to detect a fault.

The procedure 1050*d* running on node D 1005*d* detects (1055*d*) the fault 1025 (e.g., by detecting the AIS inserted by the procedure 1050*c* running on node C 1005*c*) and inserts (1060*d*) an AIS. The procedure 1050*d* determines (1065*d*) that it can take action to recover service. The procedure 1050*d* inserts (1070*d*) a recovery-in-progress indicator (RIPI).

The procedure 1050*d* determines (1075*d*) that action has not been taken (e.g., by detecting the absence of an RIPI). The procedure 1050*g* then takes action (1080*d*) to recover the fault 1025 by initiating a switch to the other recovery/protection path 1030 (node A 1005*a* to node E 1005*e* to node F 1005*f* to node D 1005*d*). Node D 1005*d* and other nodes complete the switch to the other recovery/protection path 1030.

The procedure 1050*d* running on node D 1005*d* no longer detects (1055*d*) a fault and stops inserting the AIS and RIPI at blocks 1060*d* and 1070*d*, respectively. The procedure 1050*d* returns to block 1055*d* to wait to detect another fault. The procedures 1050*c* and 1050*g* running on node C 1005*c* and node G 1005*g*, respectively, no longer detect (1055*c, g*) a fault and wait at block 1055*c, g* to detect another fault.

While this invention has been particularly shown and described with references to example embodiments thereof, it will be understood by those skilled in the art that various changes in form and details may be made therein without departing from the scope of the invention encompassed by the appended claims.

Embodiments may be implemented in hardware, firmware, software, or any combination thereof. Embodiments may also be implemented as instructions stored on a non-transient machine-readable medium, which may be read and executed by one or more processors. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others. Further, firmware, software, routines, or instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the network, flow, and block diagrams (e.g., FIG. 2) may include more or fewer elements, be arranged differently, or be represented differently. It should be understood that implementation may dictate the network, flow, and block diagrams and the number of network, flow, and block diagrams illustrating the execution of embodiments of the invention.

What is claimed is:

1. A method for coordinating recovery in a network, the method comprising:
    detecting a fault in the network, the network including at least a first recovery domain and a second recovery domain, each of the first and second recovery domains including a respective plurality of nodes interconnected to support at least one network path traversing the first and second recovery domains; and
    notifying the first recovery domain, based on an indication signal provided by the second recovery domain, that the second recovery domain is or is not taking action to recover the fault in the network.

2. The method of claim 1 wherein the first recovery domain is a parent of the second recovery domain, and the second recovery domain is a child of the first recovery domain.

3. The method of claim 1 wherein the first and second recovery domains are concatenated into a series of recovery domains.

4. The method of claim 3 wherein at least two recovery domains of the series of recovery domains overlap each another.

5. The method of claim 1 wherein notifying the first recovery domain includes inserting a recovery-in-progress signal in a maintenance message.

6. The method of claim 1 wherein notifying the first recovery domain includes notifying that the second recovery domain is taking action to recover a fault within the second recovery domain.

7. The method of claim 1 wherein notifying the first recovery domain includes notifying the first recovery domain by way of an in-band signal that takes the same path that includes the fault.

8. The method of claim 1 wherein notifying the first recovery domain includes notifying the first recovery domain by way of an out-of-band signal from a network manager.

9. The method of claim 1 wherein notifying the first recovery domain includes notifying the first recovery domain by way of an out-of-band signal that takes a path different from a path that includes the fault.

10. The method of claim 1 further comprising given an indication related to notifying the first recovery domain, applying the indication to a policy to determine whether the first recovery domain is to take action.

11. The method of claim 1 further comprising responsive to an alarm indication signal (AIS) received by a switching node within the second recovery domain, applying a recovery-in-progress signal.

12. The method of claim 1 further comprising responsive to detecting the fault, at a switching node within the second recovery domain, applying an alarm indication signal (AIS) and recovery-in-progress signal.

13. The method of claim 1 further comprising provisioning nodes within the network with a definition of a recovery-in-progress signal.

14. The method of claim 1 further comprising monitoring for a recovery-in-progress signal by a switching node within the second recovery domain and, optionally, performing an action responsive to the recovery-in-progress signal.

15. The method of claim 1 further comprising operating across multiple recovery domains.

16. The method of claim 1 further comprising operating across at least two different technologies of recovery domains selected from a group consisting of: an Optical Transport Network (OTN), Synchronous Optical Network (SONET)/Synchronous Digital Hierarchy (SDH), and Multiprotocol Label Switching-Transport Profile (MPLS)-(TP).

17. The method of claim 1 further comprising operating across at least two different network topologies of recovery domains selected from a group consisting of:
linear, ring, and mesh.

18. An apparatus to coordinate recovery in a network, the apparatus comprising:
an interface communicatively coupled to the network, the network including at least a first recovery domain and a second recovery domain, each of the first and second recovery domains including a respective plurality of nodes interconnected to support at least one network path traversing the first and second recovery domains; and
a notifying unit communicatively coupled to the interface to notify the first recovery domain based on an indication signal provided by the second recovery domain, that the second recovery domain is or is not taking action to recover a fault in the network.

19. The apparatus of claim 18 wherein the first recovery domain is a parent of the second recovery domain, and the second recovery domain is a child of the first recovery domain.

20. The apparatus of claim 18 wherein the first and second recovery domains are concatenated into a series of recovery domains,
in a network:
notify a first recovery domain that a second recovery domain is or is not taking action to recover a fault in the network to coordinate recovery in the network.

* * * * *